United States Patent

[11] 3,599,475

[72] Inventors Claude Dubouch
Gonesse;
Maurice Petit, Manosque, both of, France
[21] Appl. No. 787,679
[22] Filed Dec. 30, 1968
[45] Patented Aug. 17, 1971
[73] Assignee Commissariat A L'Energie Atomique
Paris, France
[32] Priority Jan. 5, 1968
[33] France
[31] 135 095

[54] APPARATUS FOR THE STUDY OF THERMAL CYCLING OF ELEMENTS PARTICULARLY NUCLEAR REACTOR FUEL ELEMENTS
5 Claims, 3 Drawing Figs.

[52] U.S. Cl. .................................................... 73/15
[51] Int. Cl. .................................................... G01n 25/00
[50] Field of Search ........................................ 73/15

[56] References Cited
OTHER REFERENCES

Linge: " Thermal Cycling for Nuclear Reactor Fuel Elements," in Engineer, Vol. 210, December 30, 1960, pgs. 1093— 1098.

*Primary Examiner*—James J. Gill
*Assistant Examiner*—Herbert Goldstein
*Attorney*—Cameron, Kerkam & Sutton ABSTRACT: The apparatus known as a "cycler" is made up of a gastight container in which a gas pressure can be maintained, a specimen-carrier fitted with thermocouples, a furnace surrounding said specimen-carrier and an internal heat-insulation system placed between the specimen-carrier and the internal wall of the container. The heat-insulation system is essentially made up of a stationary portion and a portion which is capable of moving with respect to this latter. The stationary portion is constructed with metallic sheets provided with aligned windows and maintained in spaced relation. The movable portion is constructed with metallic sheets provided with windows which are identical with those of the stationary portion. And the sheets of the movable portion are interposed between the sheets of the stationary portion.

APPARATUS FOR THE STUDY OF THERMAL CYCLING OF ELEMENTS PARTICULARLY NUCLEAR REACTOR FUEL ELEMENTS

This invention relates to an apparatus which is referred to as a "cycler" for the study of thermal cycling of elements such as nuclear reactor fuel elements and functions of temperature of combustion in such fields as rockets or jet aircraft.

During operation, fuel elements are subjected to thermal cycling processes each time a change in reactivity or a shutdown of the reactor takes place and this is a major cause of fatigue. The behavior of fuel elements under such conditions must be determined and the so-called "cyclers" which are commonly used for the study of fuel elements are accordingly employed for that purpose.

In general, two classes of "cycler" can be distinguished:
1. The "static cyclers," which are simple in design but moderate in performance and in which heating is supplied by a furnace whereas cooling is effected simply by shutdown of the furnace of, better still, by withdrawal of the furnace from the environment of the enclosure which contains the sample; in this case, thermal inertia is of a high order.
2. The "dynamic cyclers," which are more elaborate units and in which the test specimen to be cycled is displaced, usually by means of a jack, between a hot chamber (well heat-insulated furnace) in which the specimen undergoes a temperature rise to the high-temperature stage and a cold chamber (cooled by circulation of water in which the specimen undergoes cooling to the low-temperature stage.

With reference to a same test specimen, the overall size and capital cost of a "dynamic cycler" is multiplied by a factor of 4 to 5 compared with a "static cycler" and the heating and cooling rates are high. Moreover, between these "slow" cyclers and "fast" cyclers, it is difficult to produce a slight variation in their inherent characteristics (cooling rate and low-temperature stage in particular) inasmuch as such characteristics are virtually imposed by their design.

The aim of the present invention is primarily to improve said "cyclers" in such a manner as to meet the various practical requirements of nuclear engineering practice more effectively than has hitherto been the case, especially in such a manner as to ensure that all the advantages of both types of "cycler" which have been mentioned in the foregoing are combined while solving the problem of transition between these two types by providing the possibility of varying all the parameters at will.

The invention mainly consists both in providing a "cycler" which is made up of a gastight container in which a gas pressure can be maintained, a specimen-carrier fitted with thermocouples, a furnace which surrounds said specimen-carrier and an internal heat-insulation system which is placed between said specimen-carrier and the internal wall of said container and in constructing said heat-insulation system so that said system is made up on the one hand of a stationary portion constructed with at least one metallic sheet in which are pierced aligned windows and which are maintained in spaced relation and on the other hand of a portion which is capable of moving with respect to said stationary portion and constructed with at least one metallic sheet provided with windows which are identical with the windows of said stationary portion, said movable sheets being interposed between said stationary sheets.

Apart from said main arrangement, the invention also consists in certain additional arrangements which are preferably employed at the same time and are to be considered either separately or in any technically feasible combination, viz:

said stationary portion is made up of a helically wound stainless steel sheet, the spacing between the turns of the helix being maintained by means of longitudinal rods which are welded to said sheet, and said movable portion is made up of intermediate sliding blades which are guided by said rods,
said movable portion is driven in translational motion,
said movable portion is driven in rotational motion,
said movable portion is driven by means of a jack,
said movable portion is driven by means of a reduction-gear motor.

A better understanding of the invention will in any case be gained from the complementary description given below and from the accompanying drawings, it being understood that said description and drawings are given solely by way of indication and not in any sense by way of limitation.

In the accompanying drawings, FIG. 1 is an axial section view of an embodiment of a "cycler" in accordance with the invention;

Figure 1:
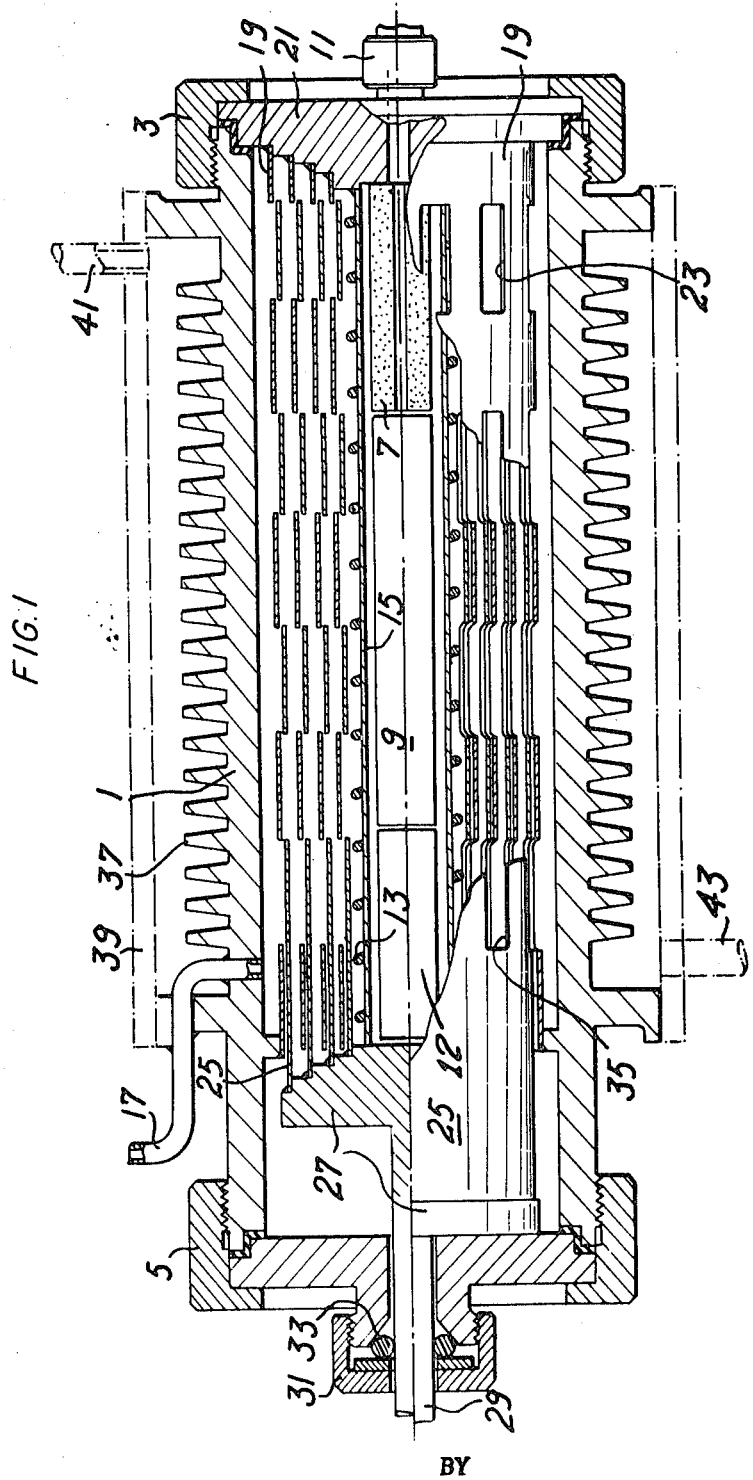
Figure 2:
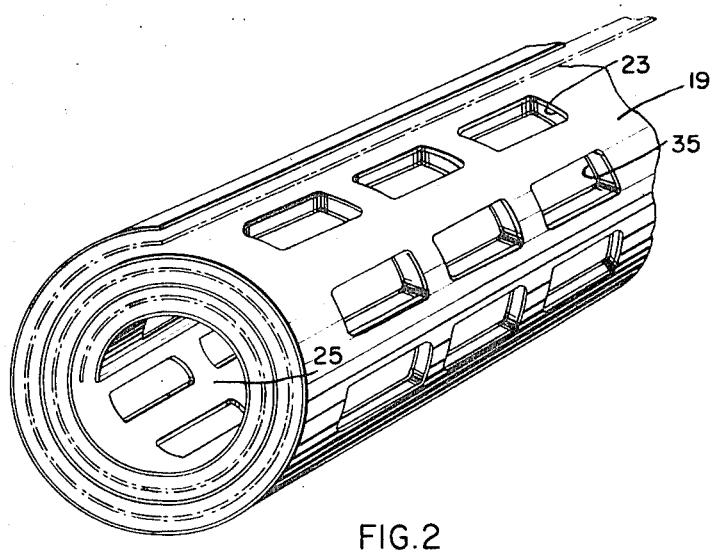
FIG. 2 is a perspective view of a portion of FIG. 1.

As can be seen from the accompanying drawings, the "cycler" comprises in the first place a pressuretight container formed of a tubular shell 1 closed by means of two end-caps 3 and 5 which are screwed onto said tubular shell 1. The test specimen 9 (fuel element) is placed in a specimen-carrier 7 and this latter is secured to the end-cap 3 in which is formed a leaktight passageway 11 for thermocouples 12. The heating furnace is formed by a heating coil 13 of shielded wire which is wound on a cylindrical sleeve 15 in which the specimen-carrier 7 is slidably fitted. A gas under pressure such as carbon dioxide, for example, can be introduced into the gastight container through the pipe 17.

The elements which have just been described are conventional in "cyclers" but the same does not apply to the internal heat-insulation system which will now be described.

The stationary portion of said heat-insulation system can be formed, for example, by a stainlesss steel sheet 19 which is wound in a helix on a support 21 which is rigidly fixed to the tubular shell 1. The spacing between the turns or layers of the coiled steel sheet 19 can be set by means of small rods 19' which are welded to the internal wall of said sheet. The shield as thus formed by the sheet 19 has each spiral provided with a window 23 these windows facing one another from one spiral to another.

Figure 3:
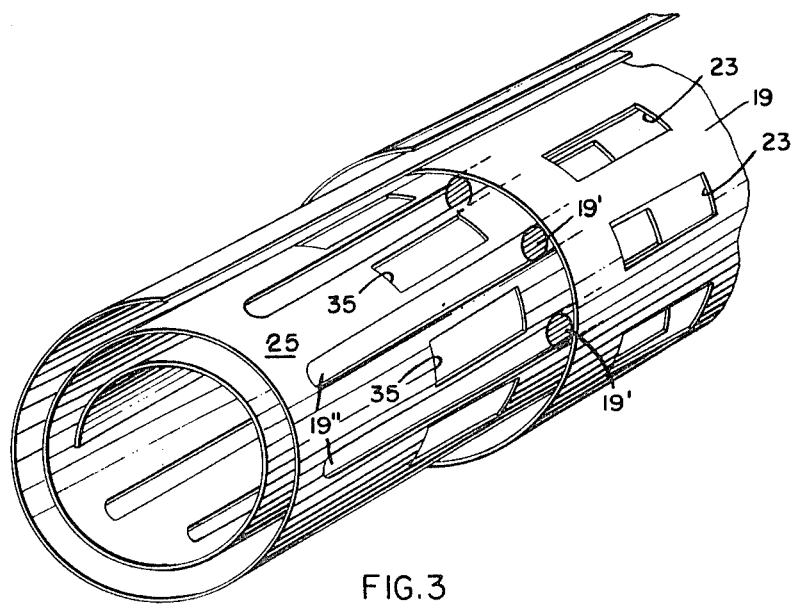
FIG. 3 is a perspective view of a modification of the structure of FIG. 1.

The movable portion of the heat-insulation system can also be made up of a stainless steel sheet 25 which is helically wound on a support 27, said support 27 being provided with an extension in the form of a drive shaft 29 which can be endowed with a movement of rotation or of translation by means of a jack or reduction-gear motor which is not illustrated in the figure. Leaktightness between the moving shaft 29 and the stationary end-cap 5 is ensured by means of a nut 31 which serves to compress a seal 33 as seen in FIG. 3, slots 19'' are provided in sheet 25 for rods 19' to allow movement between the portions. Should provision not be made for spacer rods, the movable portion could consist of a single sheet which is coiled in a helix and endowed wit: partial movement of rotation. Windows 35 which have the same dimensions as the windows 23 of the stationary portion will be formed in the movable portion and in such a manner as to be also located in register with all the windows 23.

The principle of operation of a heat-insulation system as thus described is as follows: use is made of the property of gases under pressure which permit of very substantial heat-insulation system are suppressed, heat is transferred solely by radiation (the succession of shields and layers of gas being such as to reduce conduction to the most effective extent) and the heat-insulation system has maximum efficiency. If heat flow by convection is freely established (by opening said shields and providing a communication between the layers of gas), the heat-insulation system becomes thermally permeable an its heat transparency will be correspondingly greater as the quantity of heat transferred by convection is larger.

However, it will be apparent that, from a technological standpoint, it is difficult to obtain layers of gas of sufficiently small thickness to prevent any convective process (in the case of carbon dioxide gas, for example, this thickness must be less than 1 mm.) whereas it is not a matter of difficulty to provide the degree of thermal transparency which corresponds to total transfer of heat by convection. Nevertheless, the theoretical result of calculation results in a ratio of heat transfer processes which is equal to 1:16 in both cases. This result has never before been achieved in a single "cycler" and is wholly novel.

It may additionally be noted that the tubular shell 1 of the container exhibits a degree of thermal inertia which is not negligible and which is increasingly troublesome as the heat insulation has higher heat transparency. In order to improve the performance of the "cycler," said shell 1 must therefore be cooled either by natural convection in air by means of fins such as the fin 37 or by means of water circulation within an outer casing 39 between an inlet 41 and an outlet 43.

In a particular example of construction of a "cycler" in accordance with the invention, the test specimens were 500 mm. in length and 20 mm. in diameter. The gas chosen was carbon dioxide at a pressure of 60 bars, the number of gas layers was 12, the maximum temperature of the high-temperature stage was 800° C, the minimum temperature of the low-temperature stage was below 100° C, the heating rate was 30 l to 40° C. per minute and the cooling rate was variable, viz: 50° C. per minute in natural convection, 360° C. per minute by circulating water outside the tubular shell.

It has been stated earlier that a "cycler" in accordance with the invention makes it possible to vary all the parameters between the maximum values which are attainable in the other types of "cycler." Consideration will now be given only to the two parameters whose variation gives rise to problems in conventional "cyclers." It will nevertheless be pointed out that, in the "cycler" in accordance with the invention, all the parameters are independent of each other and and that no compromise solution is therefore necessary.

The possibility of variation of the cooling rate is achieved inasmuch as the heat transfer of the insulation system varies continuously between 1 and 16, that is to say between the "closed" position in which the windows 23 and the windows such as 35 are not in aligned relation and the "open" position in which the windows 23 and the windows 35 are in exactly in register.

Furthermore, it is a matter of some difficulty in conventional "cycler" to obtain a low-temperature stage at a temperature other than a value in the vicinity of ambient temperature if the specimen is in a cooled chamber; and if the specimen is in the furnace, an intermediate temperature-stage becomes a second high-temperature stage which requires a power adjustment and regulation since the heat insulation is constant.

On the contrary, in the case of the "cycler" according to the invention, it is possible after obtaining the cooling curve to apply a low and fixed level of electric power to the furnace and to maintain at a predetermined temperature of equilibrium as a result of partial closure of the windows at the moment when this temperature is approximately attained.

The construction of a heat insulation system according to the invention may alternatively have shields movable forward and away from each other venetian-blind system; the control of the movement of the shields so as to obtain a cooling process which complies with a predetermined law; the variation of a thermal equilibrium in accordance with a given program in which the heating power is constant such as, for example, the is thermal maintenance of one container which is placed in close proximity to another and the temperature of which is variable; and the application of a variable heat-insulation system of the type proposed to fields other than that of nuclear "cyclers," for example by direct regulation as a function of temperature of combustion at high pressure in such fields as rockets or jet aircraft.

What We claim is:

1. An apparatus for the study of thermal cycling comprising a gastight container in which a gas pressure can be maintained, a specimen-carrier fitted with thermocouples, a furnace surrounding said specimen-carrier and an internal heat-insulation system between said furnace and the internal wall of said container, said heat-insulation system having a first portion of at least one metallic sheet, windows in said first portion and a second portion movable with respect to said first portion of spaced metallic sheets, aligned windows in said last-named metallic sheets identical to said windows of said first portion, said first portion being interposed between said sheets, said sheets of said second portion forming layers and means for moving said portions relative to one another and thereby move the windows of said portions in and out of alignment.

2. An apparatus in accordance with claim 1, said first portion being a helically wound stainless steel sheet, and said second portion is made up of a helically wound stainless steel sheet the two potions sliding freely relative to each other.

3. An apparatus in accordance with claim 1, said mans driving one of said portions in translation motion.

4. An apparatus in accordance with claim 1, said means driving one of said portions in rotational motion.

5. An apparatus in accordance with claim 1, said first portion being a single helically wound stainless steel sheet, longitudinal rods welded on the internal wall of said sheet and slots in said second portion for said rods allowing axial displacement of said second potion.